United States Patent
Kawai

(10) Patent No.: US 10,644,504 B2
(45) Date of Patent: May 5, 2020

(54) POWER CONVERSION APPARATUS

(71) Applicant: Mitsubishi Electric Corporation, Chiyoda-ku (JP)

(72) Inventor: Yu Kawai, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/310,269

(22) PCT Filed: Jun. 22, 2017

(86) PCT No.: PCT/JP2017/022955
§ 371 (c)(1),
(2) Date: Dec. 14, 2018

(87) PCT Pub. No.: WO2018/051600
PCT Pub. Date: Mar. 22, 2018

(65) Prior Publication Data
US 2019/0334346 A1 Oct. 31, 2019

(30) Foreign Application Priority Data
Sep. 16, 2016 (JP) ................... 2016-181364

(51) Int. Cl.
*H02J 1/10* (2006.01)
*H02J 3/38* (2006.01)
(Continued)

(52) U.S. Cl.
CPC .................. *H02J 1/10* (2013.01); *H02J 3/32* (2013.01); *H02J 3/383* (2013.01); *H02J 3/46* (2013.01); *H02M 7/493* (2013.01)

(58) Field of Classification Search
CPC ...... H02J 1/10; H02J 3/32; H02J 3/383; H02J 3/46; H02J 3/38; H02M 7/493
See application file for complete search history.

(56) References Cited

U.S. PATENT DOCUMENTS
2011/0194319 A1   8/2011   Ishioka

FOREIGN PATENT DOCUMENTS
JP   2008-22628 A   1/2008
JP   2010-98862 A   4/2010
(Continued)

OTHER PUBLICATIONS
International Search Report dated Aug. 1, 2017 in PCT/JP2017/022955 filed Jun. 22, 2017.

*Primary Examiner* — Robert L Deberadinis
(74) *Attorney, Agent, or Firm* — Oblon, McClelland, Maier & Neustadt, L.L.P.

(57) ABSTRACT

In an electrical power conversion apparatus including DC power sources, electric power converter units, and an electric power sharing regulator for regulating electric power on a basis of individual electric power converter units, when the plurality of electric power converter units connects thereto a plurality of DC power sources on their input sides, and is connected in parallel with one another on their output sides, three threshold values of rated electric power, electric power of the highest efficiency, and electric power of allowable efficiency receive attention from an efficiency characteristic of each of the electric power converter units, and the adjustment of electric power shared by each of the electric power converter units is performed by the electric power sharing regulator so that better efficiency is achieved when the apparatus is viewed in its entirety.

15 Claims, 10 Drawing Sheets

(51) Int. Cl.
*H02J 3/32* (2006.01)
*H02J 3/46* (2006.01)
*H02M 7/493* (2007.01)

(56) References Cited

FOREIGN PATENT DOCUMENTS

| | | | |
|---|---|---|---|
| JP | 5272033 | B2 | 8/2013 |
| JP | 2017-60303 | A | 3/2017 | i-TH CONVERTER'S EFFICIENCY CHARACTERISTIC

POWER CONVERSION APPARATUS

TECHNICAL FIELD

The present application relates to achieving increased efficiency of electricity conversion in an electrical power conversion apparatus whose electric power converter units are multi-structured in parallel with one another at their input ends or output ends.

BACKGROUND ART

In recent years, the market of electric energy storage devices such as a photovoltaic power generating device, and an electric automotive vehicle, an emergency power source and the like is expanding, so that technical developments of a zero-energy house and a zero-energy building receive attention in which purchased electric power from an electric power system is made zero by means of an apparatus where those devices are combined. However, when a plurality of different electric energy storage devices is used in which they are multi-structured in parallel with one another, there exists a condition in which better efficiency is achieved when limits are imposed on the operating number of the electric energy storage devices and on their electric power sharing by responding to their charge-discharge electric-power than when all of the electric energy storage devices charges or discharges their electric power at the same ratios through their electric power sharing.

In Patent Document 1, a plurality of electric power converters each of which has the same electric-power capacity is used, and electric power corresponding to the highest efficiency of each of the electric power converters and rated electric power thereof are preferentially utilized, whereby increased efficiency is implemented. However, when a plurality of electric power converters each of which has different electric-power capacity is used, higher efficiency is achieved under a condition in which electric power is small when a plurality of electric power converters each of which has small electric-power capacity is used than when one piece of an electric power converter having large electric-power capacity is used; higher efficiency is achieved under a condition in which the electric power is large when an electric power converter having better efficiency is preferentially utilized from among the electric power converters; and so forth. Because the conditions differ for the sake of increased efficiency, there exists a condition in which such utilization in Patent Document 1 does not result in increased efficiency.

RELATED ART DOCUMENT

Patent Document

[Patent Document 1] Japanese Patent Publication No. 5272033

SUMMARY OF THE INVENTION

Problems to be Solved by the Invention

It can be found that a scheme stated in Patent Document 1 described above takes a configuration in which a plurality of electric power converters each of which has the same electric-power capacity is used, and so, when a plurality of electric power converters each of which has different electric-power capacity is used for increased efficiency of an electrical power conversion apparatus, the application of the scheme is not suitable for. For dealing therewith, in order to implement increased efficiency of an electrical power conversion apparatus in which a plurality of electric power converter units each of which has different electric-power capacity is connected in parallel with one another, the apparatus that provides a function to regulate an electric power sharing ratio of each of the electric power converter units is considered.

Means for Solving the Problems

An electrical power conversion apparatus according to the present application comprises:

a plurality of electric power converter units being connected in parallel with one another, and each possessing electric power information indicating a relationship between a value of electric power and efficiency, and attribute information including information of a degree of operating priority being an operating order; and an electric power sharing regulator for regulating, by responding to demanded electric power, electric power shared by each of the electric power converter units; the apparatus is characterized in that the electric power sharing regulator supervises go/no-go determination of electrical power conversion operations of the electric power converter units with reference to the attribute information taken in possession from each of the electric power converter units, and regulates electric power in which each of the electric power converter units shares.

Effects of the Invention

An electrical power conversion apparatus according to the present application includes a plurality of electric power converter units connecting thereto a plurality of DC power sources on their input sides, and being connected in parallel with one another on their output sides; and an electric power sharing regulator for regulating electric power in every one of the electric power converter units, wherein, by utilizing an efficiency characteristic (the property indicating the relationship between electric power and efficiency) of each of the electric power converter units, it is so arranged to perform the adjustment of electric power in which each of the electric power converter units shares among them by means of the electric power sharing regulator so as to achieve better efficiency when the apparatus is viewed in its entirety, so that, in comparison with a case in which a ratio per rated electric power of all of electric power converters is uniformly determined, it becomes possible to make electric power conversion efficiency further higher when the apparatus is viewed in its entirety.

In addition, the electrical power conversion apparatus according to the present application can identify, in order to implement the increased efficiency, a condition in which each of the electric power converter units shares a value of electric power or the like with one another by acquiring the condition by means of a hand-operated or manual setting or communications, so that increased efficiency of electrical power conversion can be implemented by responding to demanded electric power from an external device or the like.

EMBODIMENTS FOR CARRYING OUT THE INVENTION

Embodiment 1

Figure 1:
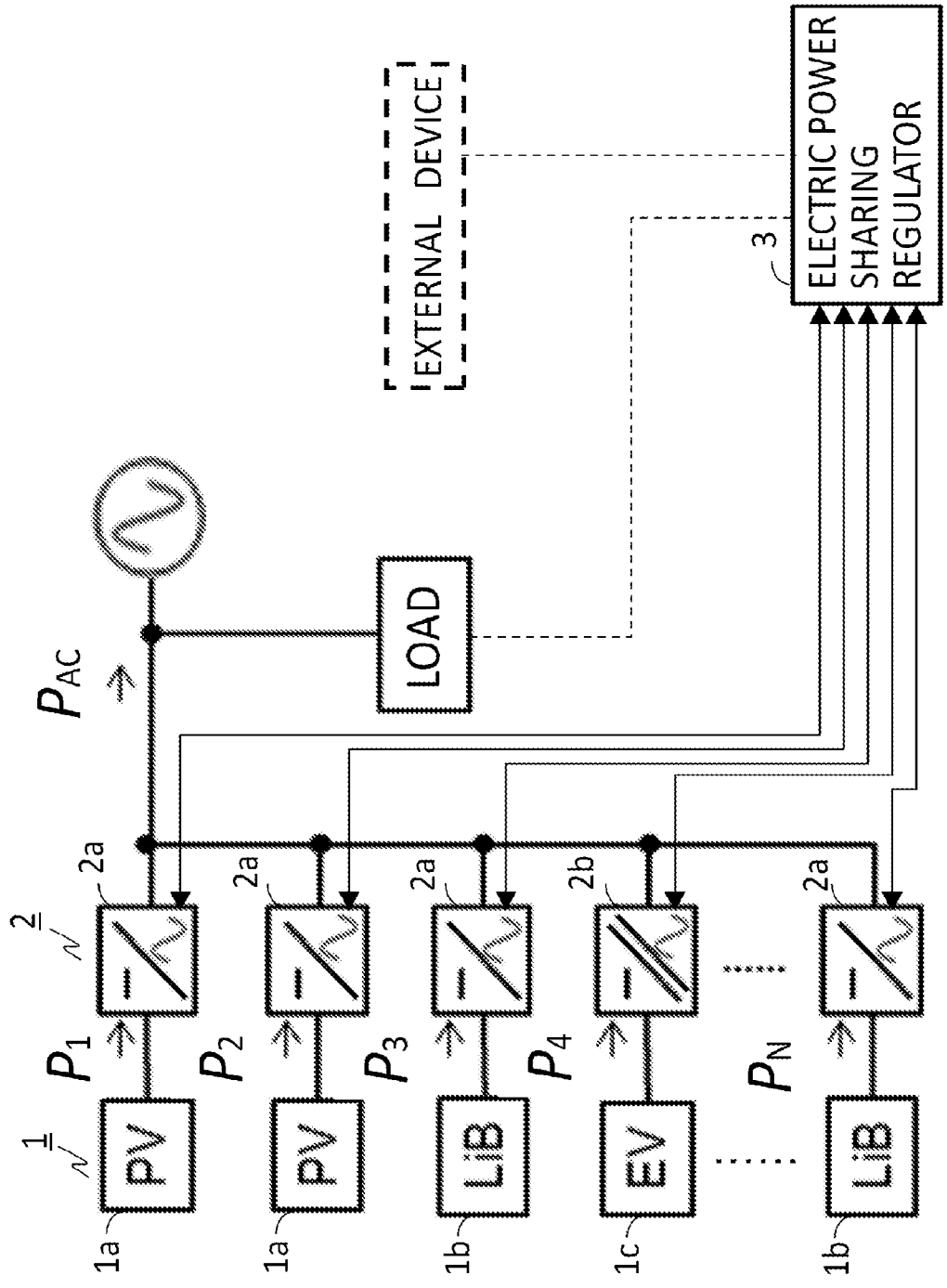
FIG. 1 is a circuit diagram of an electrical power conversion apparatus according to Embodiment 1 of the present application.

FIG. 1 is a diagram illustrating an example of a configuration of an electrical power conversion apparatus according to Embodiment 1 of the present application.

As illustrated in the figure, the electrical power conversion apparatus includes an electric power sharing regulator 3, to which electric power converter units 2 are connected in parallel with one another at their output positions, for regulating each of the electric power converter units by responding to demanded electric power at their parallel output ends (for example, the regulator regulates values of electric power in which each of the electric power converter units shares with one another). The electric power sharing regulator 3 includes a function to acquire electric power information corresponding to a rated efficiency point, a highest efficiency point and an allowable efficiency point of the electric power converter units 2 each used for the electrical power conversion apparatus. As for the demanded electric power, utilized is a value inputted into the electric power sharing regulator 3 from an external device, a control calculation result (refer to the broken line linking between the load and the electric power sharing regulator 3 in the figure) corresponding to an AC load or a flow of electric power, or an arbitrary setting value. In the manner described above, "electric power information" designates in principle a pair (set) of a value of the electric power where applicable and, corresponding thereto, a value of the efficiency of an electric power converter unit (hereinafter, simply referred to as "efficiency"); the electric power information is usually information in which each of the electric power converter units holds in its internal memory or the like in advance as two-dimensional numeric data given through an input setting by means of a manual operation of a worker or through a communications means.

As for a DC power source 1, a power source is used which is representative of a solar or photovoltaic battery 1a (abbreviated as an "PV" in the figure), a stationary storage battery (for example, a lithium ion battery 1b, abbreviated as an "LiB" in the figure), a mobile or vehicular storage battery (an electric automotive vehicle 1c (Electric Vehicle, abbreviated as an "EV" in the figure) or the like), a fuel cell (not shown in the figure), or the like; and, with respect to the electrical power conversion apparatus, different categories of power sources may be used for. When one piece of the DC power source 1 is connected to two pieces of the electric power converter units 2 or more, the DC power source 1 notifies its category and information for identifying the individual to the electric power converter units 2 on an as-needed basis. In addition, the DC power source 1 has, as the occasion requires, a device for supervising or monitoring the power source, and notifies, to the electric power converter unit (s) 2 on an as-needed basis, information of the limit of a charging current, the limit of a discharging current, overcharge, overdischarge and the like by means of the device for supervising or monitoring the power source. Based on the information of the device for supervising or monitoring the power source, the electric power converter units 2 each impose the limit on a unit's own charging operation or discharging operation, and notify the modified operating state to the electric power sharing regulator 3 on an as-needed basis. The electric power converter units 2 are constituted of, as broadly divided into, an electric power converter unit 2a of non-isolation type (a unit using a single hatched line in the figure) and an electric power converter unit 2b of isolation type (a unit using double hatched lines in the figure) (their explanation will be made later in detail).

As for the electric power converter unit 2 of the electrical power conversion apparatus, an electric power converter is used which is representative of a non-isolation-type DC/DC converter, an isolation-type DC/DC converter, a single-phase inverter, a three-phase inverter, or the like; and, as for the electric power converter units 2, a plurality of those may be usedbeing connected in parallel with respect to one piece of the DC power source 1 (hereinafter also referred to as "plurality-parallel"). With respect to the electric power sharing regulator 3, the electric power converter units 2 each notify, by using three kinds of efficiency of rated efficiency (efficiency corresponding to a first electric-power threshold value), the highest efficiency (efficiency corresponding to a second electric-power threshold value) and allowable efficiency (efficiency corresponding to a third electric-power threshold value) from a characteristic between electric power of each of electric power converters and the efficiency thereof, information including the first electric-power threshold value, the second electric-power threshold value and the third electric-power threshold value, and also acquire electric power sharing instructions from the electric power sharing regulator 3.

Figure 2:
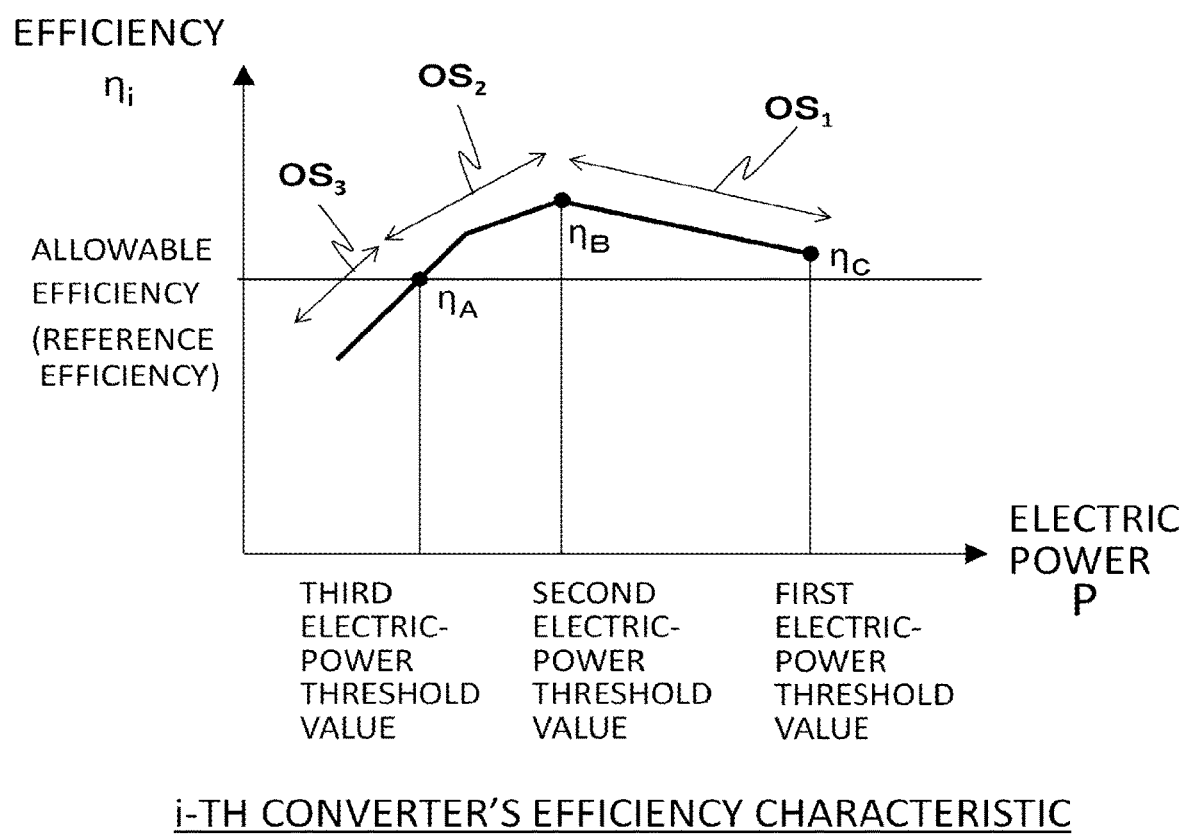
FIG. 2 is a diagram for explaining the relationship between an efficiency characteristic of an electric power converter unit and electric-power threshold values thereof according to Embodiment 1 of the present application.

FIG. 2 is a diagram for explaining the relationship between an efficiency characteristic of the electric power converter unit 2 and electric-power threshold values thereof. In the figure, the values of electric power corresponding to the rated efficiency $\eta_C$, the highest efficiency $\eta_B$, and the allowable efficiency $\eta_A$ of the electric power converter unit 2 are a first electric-power threshold value, a second electric-power threshold value, and a third electric-power threshold value, respectively. The electric power sharing regulator 3 regulates to share electric power of each of the electric power converter units 2 (which means to perform the regulation for sharing) so that electric power conversion efficiency of the electrical power conversion apparatus is increased by responding to demanded electric power. A mode for selecting electric power between the first electric-power threshold value and the second electric-power threshold value (a state therebetween is referred to as an "operating state 1," $OS_1$ in the figure) or zero is referred to as a first operation mode; a mode for selecting electric power between the second electric-power threshold value and the third electric-power threshold value (a state therebetween is referred to as an "operating state 2," $OS_2$ in the figure) or zero is referred to as a second operation mode; and a mode for selecting electric power of the third electric-power threshold value or less (a state beneath the value is referred to as an "operating state 3," $OS_3$ in the figure) or zero is referred to as a third operation mode. The electrical power conversion apparatus of the embodiment is characterized in that the apparatus has a highly efficient charge-discharge function including a function for selecting one operation mode from these three types of operation modes.

It may be adopted that the electric power sharing regulator 3 preferentially selects an arbitrary one of the DC power sources 1 as an object of electric charging or electric discharging, whereas it may be adopted that an arbitrary one of the DC power sources 1 is removed from a controlled object (a target for the regulation) by responding to demanded electric power. The electric power sharing regulator 3 manages or supervises go/no-go determination of electrical power conversion operations of the electrical power conversion apparatus by acquiring information of a connection state between the DC power sources 1 and the electric power converter units 2 by way of the electric power converter units 2, or by setting the connection state in advance. The electric power sharing regulator 3 determines, by responding to charge-discharge electric-power being demanded from the configuration of the electrical power conversion apparatus, electric power sharing of each of the electric power converter units 2 in which electricity conversion efficiency is good. A form of each of inputs and that of each of parallel outputs in the electrical power conversion apparatus are not limited to of direct current, but either one of them or both of them may be of alternating current. Note that, the information of a connection state described above is information which is particularly required when the DC power source 1 described above is a DC power source of a mobile body (for example, an EV or the like). In addition, the "go/no-go determination of electrical power conversion operations" means, when the electrical power conversion apparatus is viewed in its entirety, go/no-go determination of an electrical power conversion operation of each of the DC power sources and each of the electric power converter units.

Figure 3:
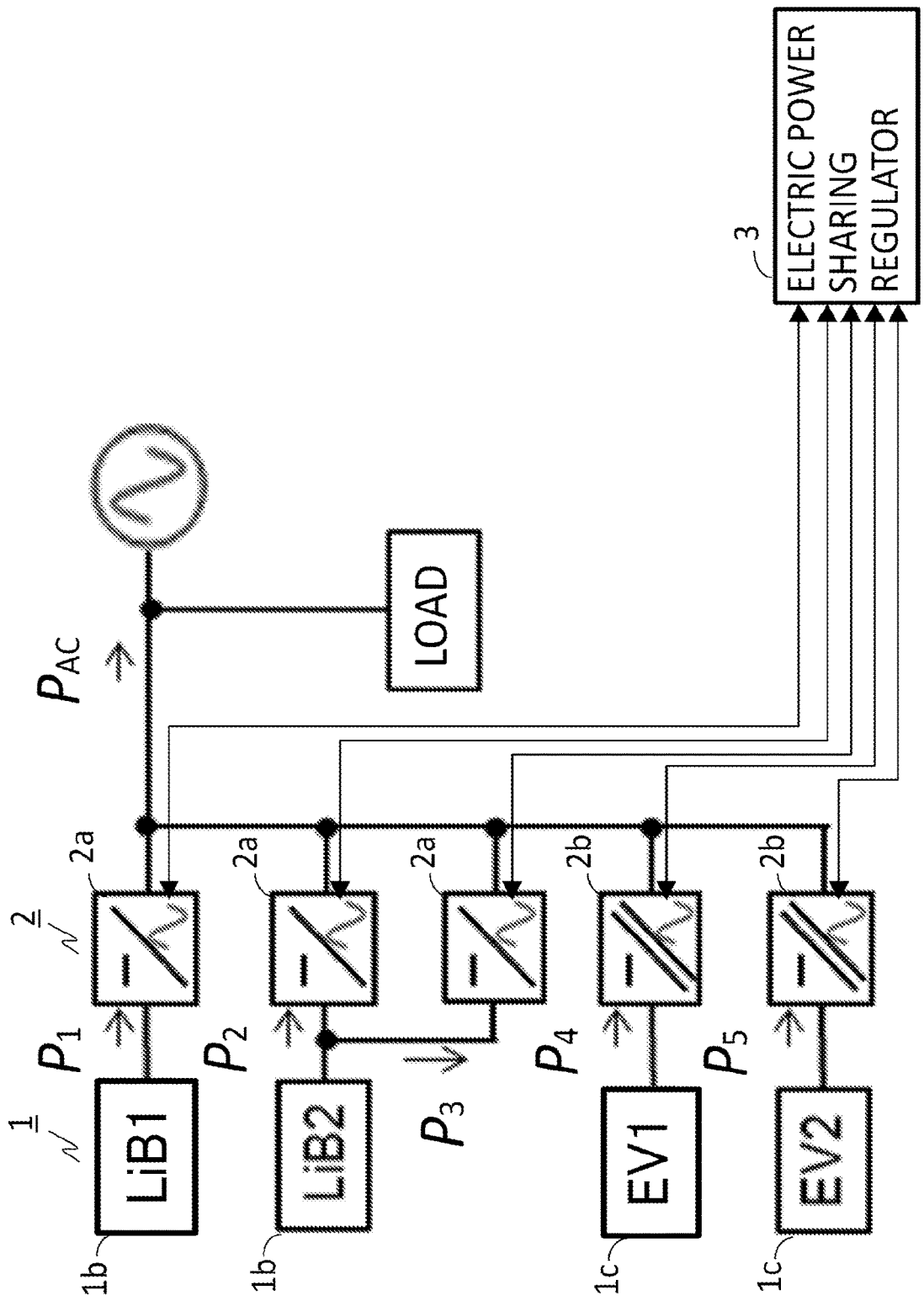
FIG. 3 is a diagram showing a configuration example of an electrical power conversion apparatus according to Embodiment 1 of the present application.

FIG. 3 is a diagram illustrating a configuration example of an electrical power conversion apparatus according to Embodiment 1 of the present application. The electrical power conversion apparatus in the figure has a total sum of the four DC power sources 1 of two types, and a total sum of the five electric power converter units 2 of two types; among them, one of the DC power sources 1 is commonly connected to the two electric power converter units 2 of the same type.

Figure 4:
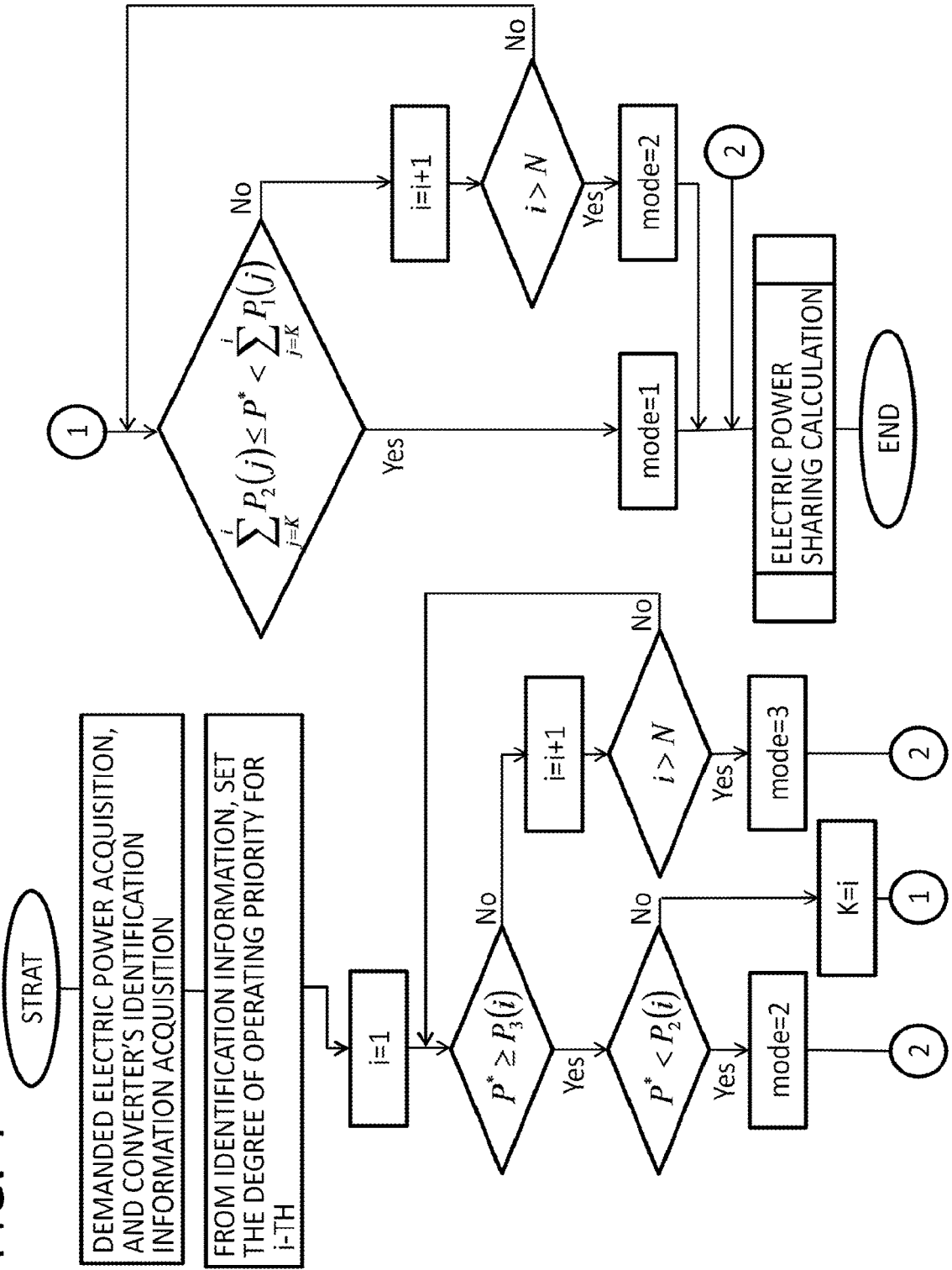
FIG. 4 is a diagram showing a configuration example of the selection flow of operation modes according to Embodiment 1 of the present application.

FIG. 4 is a diagram showing an example of the selection flow of operation modes for a highly efficient charge-discharge function of the electrical power conversion apparatus constituted of the number "N" of electric power converter units 2 according to Embodiment 1 (hereinafter referred to as an "Flow Example F1"). The electric power sharing regulator 3 recognizes a first electric-power threshold value through a third electric-power threshold value based on identification information acquired from each of the electric power converter units 2. Degrees of operating priority of the plurality of electric power converter units 2 operated by means of the electric power sharing regulator 3 are set in decreasing order of first electric-power threshold values. Note that, it may be adopted that, when the aforementioned identification information has information corresponding to degrees of priority, a sequential order of the degrees of operating priority is modified.

Figure 5:
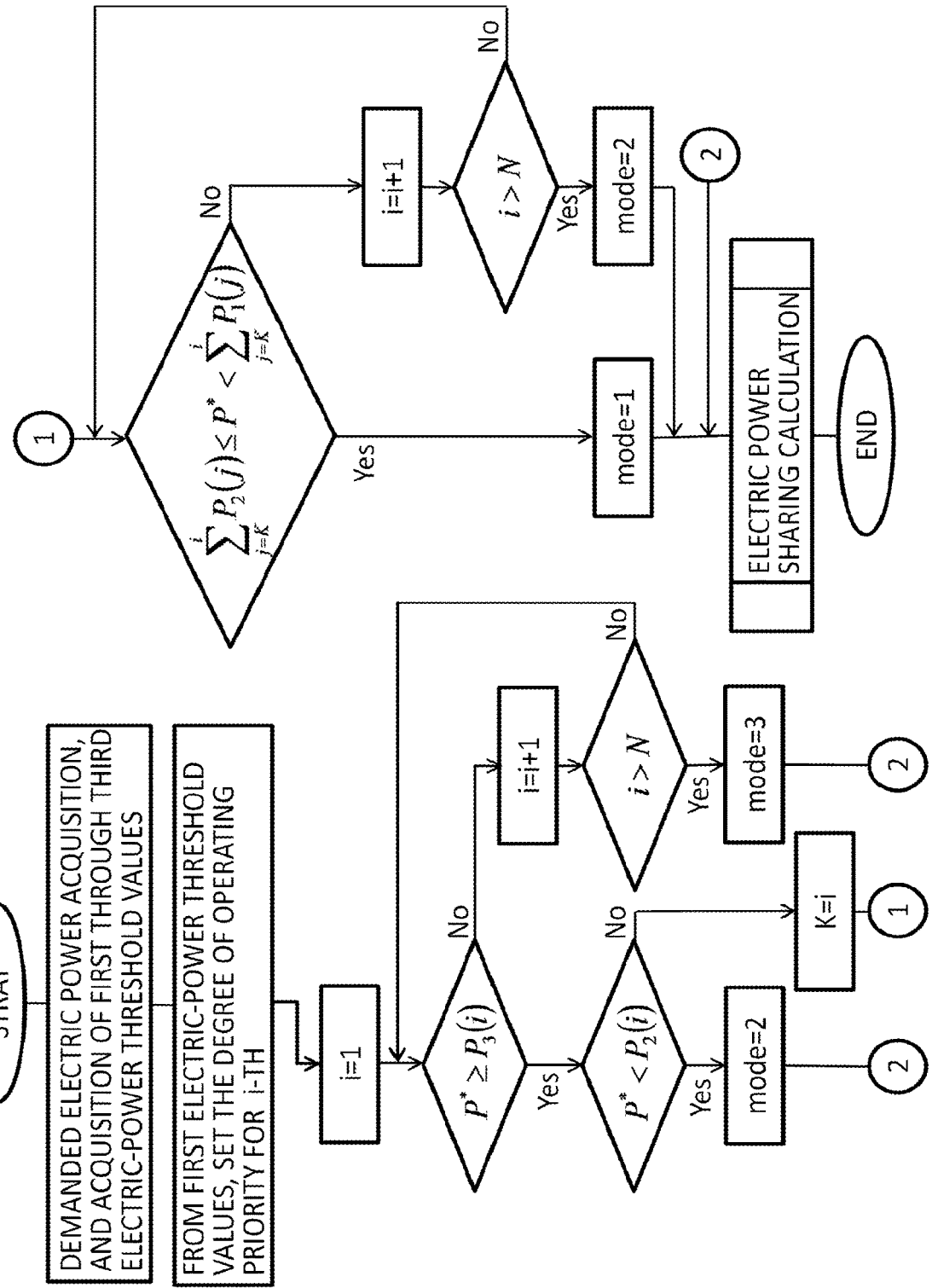
FIG. 5 is a diagram showing another configuration example of the selection flow of operation modes according to Embodiment 1 of the present application.

FIG. 5 is a diagram showing another selection flow of operation modes for a highly efficient charge-discharge function of the electrical power conversion apparatus constituted of the number "N" of electric power converter units 2 according to Embodiment 1 (hereinafter referred to as an "Flow Example F2"). The electric power sharing regulator 3 acquires a first electric-power threshold value through a third electric-power threshold value from each of the electric power converter units. Degrees of operating priority of the plurality of electric power converter units 2 operated under the electric power sharing regulator 3 are set thereby for the electric power converter units in the order having the largest one of first electric-power threshold values.

The explanation will be made for Flow Example F1 shown in FIG. 4. First, the explanation will be made for the symbols used in the figure. Symbol "P*" designates demanded electric power. Symbol "$P_n$ (j)" designates a threshold value of electric power, where the symbol "n" is a natural number in any one from 1 to 3. Expression "mode=n ("n" is a natural number in any one from 1 to 3)" designates an n-th operation mode. Symbol "N" designates the number of converter units. Note that, the symbols "i" and "K" are parameters each of which has an initial value of 1. Note also that, the explanation for the symbols described above is equivalent or similar to those in FIG. 5, FIG. 8 and FIG. 9 below.

Next, the explanation will be made for the contents of the flow of selecting an operation mode as follows.

Firstly, when demanded electric power is not more than third electric-power threshold values of all the number "N" of converter units, a third operation mode ("mode=3" in the figure) is selected. Secondly, when the demanded electric power is not less than third electric-power threshold values of the individual converter units, and is not more than second electric-power threshold values of the converter units, a second operation mode ("mode=2" in the figure) is selected. Thirdly, when the demanded electric power is not less than second electric-power threshold values of the number of plurality of converter units, and is not more than first electric-power threshold values of the converter units, a first operation mode ("mode=1" in the figure) is selected. Fourthly, when the first through third conditions are not inclusively applicable, and also when the demanded electric power is not more than a total sum of first electric-power threshold values of converter units capable of performing their electric power adjustment, the second operation mode is selected. It should be noted that, basic operations of Flow Example F2 shown in FIG. 5 are equivalent or similar to those of aforementioned Flow Example F1, and so, their detailed explanation will be omitted.

In Embodiment 1, one electric power converter unit 2 is determined, by responding to demanded electric power, for an adjusting purpose among the plurality of electric power converter units 2, and the remaining electric power converter units 2 are operated at constant charge-discharge electric-power. Here, a constant charge-discharge electric-power is a value of electric power of all the other converters other than the adjusting one. At the time of first operation mode, the constant charge-discharge electric-power is electric power corresponding to a first electric-power threshold value, a second electric-power threshold value or zero; at the time of second operation mode, that is electric power corresponding to a second electric-power threshold value, a third electric-power threshold value or zero; and, at the time of third operation mode, that means electric power corresponding to zero. In addition, the electric power sharing regulator 3 undertakes to preferentially share a second electric-power threshold value more than a first electric-power threshold value, whereby increased efficiency is implemented.

Figure 6A:
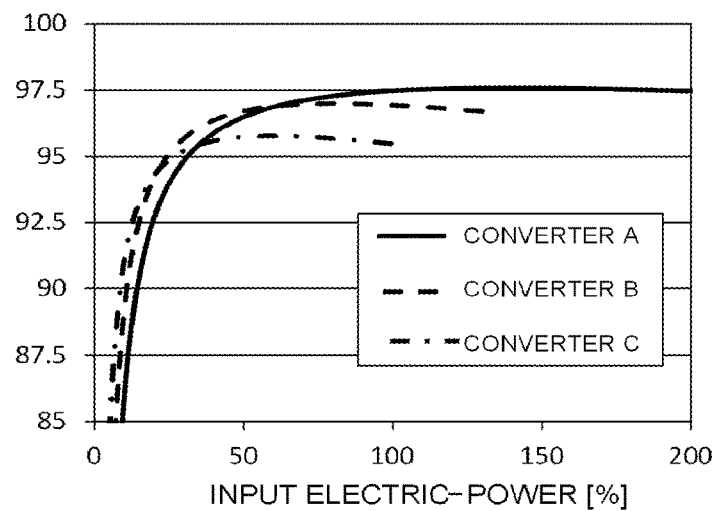
FIG. 6A and FIG. 6B are diagrams each showing characteristic examples in a three-unit configuration of electric power converter units having different electric power ratings according to Embodiment 1 of the present application and Embodiment 3 thereof.
Figure 6B:
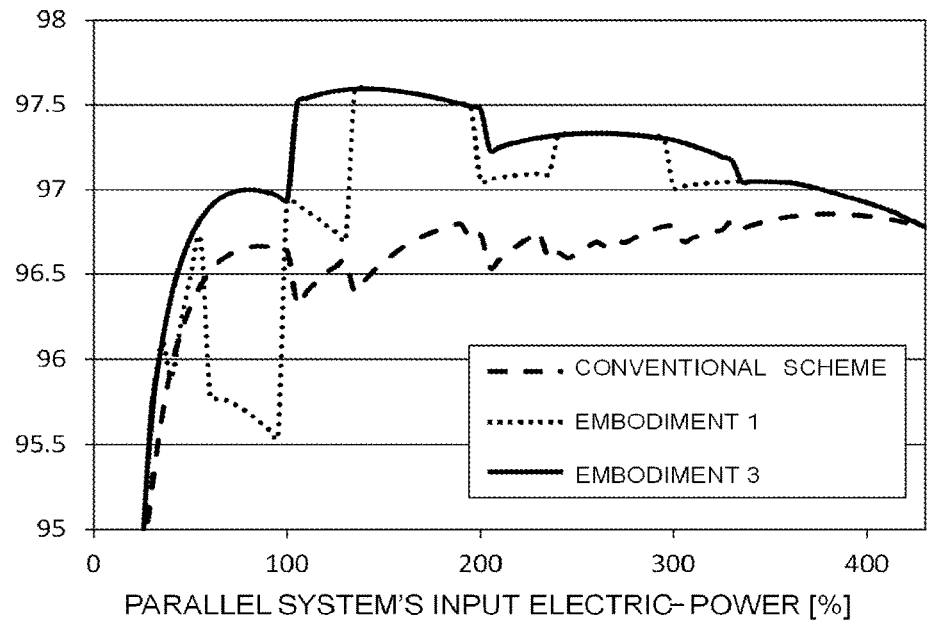

Firstly, as a first example, the explanation will be made below in more detail for the procedures in which the electrical power conversion apparatus is constituted of three units of the electric power converter units 2 each having different electric-power capacity as the converter A, the converter B and the converter C shown in FIGS. 6A and 6B (it should be stated as "an electric power converter unit A, an electric power converter unit B and an electric power converter unit C," but instead stated for the sake of simplicity as "a converter A, a converter B and a converter C," for purposes of avoiding complicated explanation: hereinafter in a similar fashion), and the electric power sharing regulator 3 performs to implement electric power sharing responding to demanded electric power by using the electrical power conversion apparatus which shares the electric power in a sequential order with respect to degrees of operating priority of the converter A, the converter B and the converter C. Here, FIG. 6A is a diagram showing electric power conversion efficiencies with respect to input electric-power in every one of the individual converters A, B and C; and FIG. 6B is a diagram showing the relationship between input electric-power and the electric power conversion efficiencies when electric power sharing schemes are modified using the converters shown in FIG. 6A, and is the diagram for explaining the difference of conversion efficiencies in cases in which the electric power sharing schemes are modified from a conventional scheme to the schemes carried out in the present application.

First, the explanation will be made for condition settings. A first electric-power threshold value of the converter A is set at 200% of normalized electric power; a second electric-power threshold value thereof, set at 140% of the normalized electric power; and a third electric-power threshold value thereof, set at 40% of the normalized electric power. A first electric-power threshold value of the converter B is set at 130% of the normalized electric power; a second electric-power threshold value thereof, set at 100% of the normalized electric power; and a third electric-power threshold value thereof, set at 30% of the normalized electric power. A first electric-power threshold value of the converter C is set at 100% of the normalized electric power; a second electric-power threshold value thereof, set at 60% of the normalized electric power; and a third electric-power threshold value thereof, set at 40% of the normalized electric power.

In the manner described above, the "normalized electric power" means electric power when input electric-power of the converter C is at 100% (hereinafter, the same applies to).

In the electrical power conversion apparatus constituted of the converter A through the converter C of the same electric-power capacity, the maximum charge-discharge electric-power of a parallel system is at 430% of the normalized electric power. Consequently, the electric power sharing regulator 3 regulates electric power sharing of the converter A through the converter C by responding to demanded electric power according to parallel system's charge-discharge in a manner as described below.

When the demanded electric power is in a range from 430% of the normalized electric power or less to 390% thereof or more (which is hereinafter stated as "from 430% or less to 390% or more" for brevity, and the wording "in a range" is omitted because of undergoing complication), the converter C is selected as an adjusting one, and electric power sharing of the converter A and that of the converter B (in order to simplify the explanation, the wording of "electric power sharing of" is omitted, and so, hereinafter in the explanation) are selected at their first electric-power threshold values.

When the demanded electric power is in a range from less than 390% of the normalized electric power to 360% thereof or more (which is hereinafter stated as "from less than 390% to 360% or more" for brevity, and the wording "in a range" is omitted because of undergoing complication), the converter C is selected at its second electric-power threshold value; the converter B, selected as an adjusting one; and the converter A, selected at its first electric-power threshold value.

When the demanded electric power is from less than 360% of the normalized electric power to 300% thereof or more, the converter A is selected as an adjusting one, and the converter B and the converter C are selected at their second electric-power threshold values.

When the demanded electric power is from less than 300% of the normalized electric power to 240% thereof or more, the converter A is selected as an adjusting one; the converter B, selected at its second electric-power threshold value; and the converter C, selected at a zero output.

When the demanded electric power is from less than 240% of the normalized electric power to 200% thereof or more, the converter A is selected as an adjusting one; the converter B, selected at a zero output; and the converter C, selected at its second electric-power threshold value.

When the demanded electric power is from less than 200% of the normalized electric power to 130% thereof or more, the converter A is selected as an adjusting one, and the converter B and the converter C are selected at zero outputs.

When the demanded electric power is from less than 130% of the normalized electric power to 100% thereof or more, the converter B is selected as an adjusting one, and the converter A and the converter C are selected at zero outputs.

When the demanded electric power is from less than 100% of the normalized electric power to 60% thereof or more, the converter C is selected as an adjusting one, and the converter A and the converter B are selected at zero outputs.

When the demanded electric power is from less than 60% of the normalized electric power to 40% thereof or more, the converter A is selected as an adjusting one, and the converter B and the converter C are selected at zero outputs.

When the demanded electric power is from less than 40% of the normalized electric power to 30% thereof or more, the converter B is selected as an adjusting one, and the converter A and the converter C are selected at zero outputs.

When the demanded electric power is less than 30% of the normalized electric power, the converter C is selected as an adjusting one, and the converter A and the converter B are selected at zero outputs.

In a case in which electric power of electric charging or electric discharging of the converter A is limited to 150% of the normalized electric power due to the limit on electric charging or electric discharging of the converter A, the electric power sharing regulator 3 regulates electric power sharing of the converter A through the converter C by responding to demanded electric power due to system's charge-discharge in a manner as described below.

Note that, by means of the electric power sharing regulator 3, a first electric-power threshold value of the converter A is modified from 200% to 150%.

When the demanded electric power is from 380% of the normalized electric power or less to 340% thereof or more, the converter C is selected as an adjusting one, and the converter A and the converter B are selected at their first electric-power threshold values.

When the demanded electric power is from less than 340% of the normalized electric power to 310% thereof or more, the converter A is selected at its first electric-power threshold value; the converter B, selected as an adjusting one; and the converter C, selected at its second electric-power threshold value.

When the demanded electric power is from less than 310% of the normalized electric power to 300% thereof or more, the converter A is selected as an adjusting one, and the converter B and the converter C are selected at their second electric-power threshold values.

When the demanded electric power is from less than 300% of the normalized electric power to 285% thereof or more, the converter A is selected at its second electric-power threshold value; the converter B, selected at its second electric-power threshold value; and the converter C, selected as an adjusting one.

When the demanded electric power is from less than 285% of the normalized electric power to 250% thereof or more, the converter A is selected at its first electric-power threshold value; the converter B, selected as an adjusting one; and the converter C, selected at a zero output.

When the demanded electric power is from less than 250% of the normalized electric power to 240% thereof or more, the converter A is selected as an adjusting one; the converter B, selected at its second electric-power threshold value; and the converter C, selected at a zero output.

When the demanded electric power is from less than 240% of the normalized electric power to 170% thereof or more, the converter A is selected at its second electric-power threshold value; the converter B, selected as an adjusting one; and the converter C, selected at a zero output.

When the demanded electric power is from less than 170% of the normalized electric power to 150% thereof or more, the converter A is selected as an adjusting one; the converter B, selected at its third electric-power threshold value; and the converter C, selected at a zero output.

When the demanded electric power is from less than 150% of the normalized electric power to 130% thereof or more, the converter A is selected as an adjusting one, and the converter B and the converter C are selected at zero outputs.

When the demanded electric power is from less than 130% of the normalized electric power to 100% thereof or more, the converter B is selected as an adjusting one, and the converter A and the converter C are selected at zero outputs.

When the demanded electric power is from less than 100% of the normalized electric power to 60% thereof or more, the converter C is selected as an adjusting one, and the converter A and the converter B are selected at zero outputs.

When the demanded electric power is from less than 60% of the normalized electric power to 40% thereof or more, the converter A is selected as an adjusting one, and the converter B and the converter C are selected at zero outputs.

When the demanded electric power is from less than 40% of the normalized electric power to 30% thereof or more, the converter B is selected as an adjusting one, and the converter A and the converter C are selected at zero outputs.

When the demanded electric power is less than 30% of the normalized electric power, the converter C is selected as an adjusting one, and the converter A and the converter B are selected at zero outputs.

In a case in which electric power of electric charging or electric discharging of the converter A is limited to 100% of the normalized electric power due to the limit on electric charging or electric discharging of the converter A, the electric power sharing regulator 3 regulates electric power sharing of the converter A through the converter C by responding to demanded electric power due to system's charge-discharge in a manner as described below.

Note that, by means of the electric power sharing regulator 3, a first electric-power threshold value of the converter A and a second electric-power threshold value thereof are both set at 100%.

When the demanded electric power is from 330% of the normalized electric power or less to 290% thereof or more, the converter A is selected at its second electric-power threshold value; the converter B, selected at its first electric-power threshold value; and the converter C, selected as an adjusting one.

When the demanded electric power is from less than 290% of the normalized electric power to 260% thereof or more, the converter A and the converter C are selected at their second electric-power threshold values, and the converter B is selected as an adjusting one.

When the demanded electric power is from less than 260% of the normalized electric power to 240% thereof or more, the converter A and the converter B are selected at their second electric-power threshold values, and the converter C is selected as an adjusting one.

When the demanded electric power is from less than 240% of the normalized electric power to 230% thereof or more, the converter A and the converter C are selected at their second electric-power threshold values, and the converter B is selected as an adjusting one.

When the demanded electric power is from less than 230% of the normalized electric power to 130% thereof or more, the converter A is selected at its second electric-power threshold value; the converter B, selected as an adjusting one; and the converter C, selected at a zero output.

When the demanded electric power is from less than 130% of the normalized electric power to 100% thereof or more, the converter B is selected as an adjusting one, and the converter A and the converter C are selected at zero outputs.

When the demanded electric power is from less than 100% of the normalized electric power to 60% thereof or more, the converter C is selected as an adjusting one, and the converter A and the converter B are selected at zero outputs.

When the demanded electric power is from less than 60% of the normalized electric power to 40% thereof or more, the converter A is selected as an adjusting one, and the converter B and the converter C are selected at zero outputs.

When the demanded electric power is from less than 40% of the normalized electric power to 30% thereof or more, the converter B is selected as an adjusting one, and the converter A and the converter C are selected at zero outputs.

When the demanded electric power is less than 30% of the normalized electric power, the converter C is selected as an adjusting one, and the converter A and the converter B are selected at zero outputs.

As described above, even when the limit on electric charging or electric discharging of the electric power converter units 2 is imposed, the electric power sharing regulatory or adjustment function by means of the electric power sharing regulator 3 is effective. Note that, because the aforementioned electric-power limitation is a limit imposed on one side in electric charging or electric discharging, it may be suitable for a form in which the limit is imposed only on an either polarity.

Figure 7A:
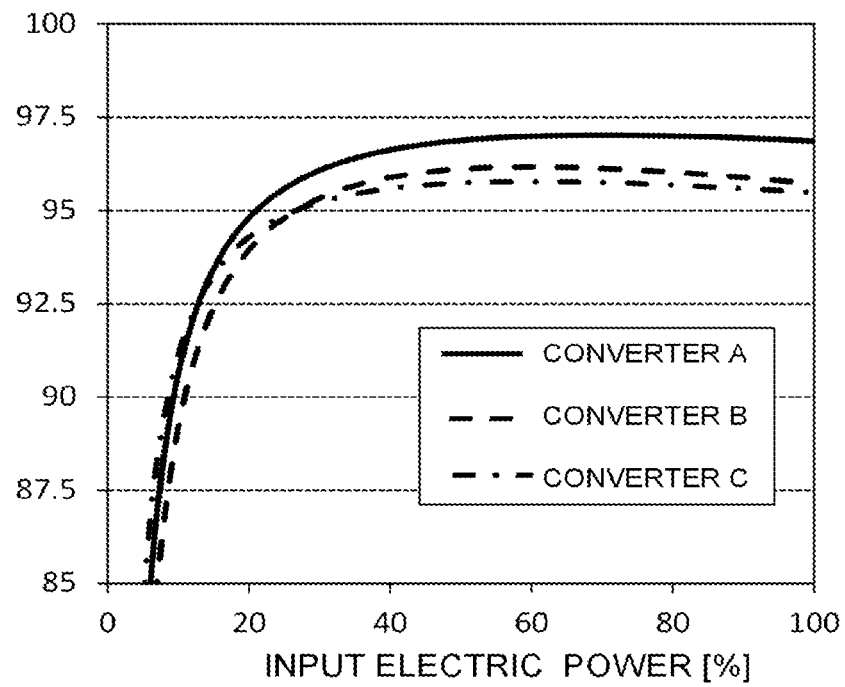
FIG. 7A and FIG. 7B are diagrams each showing characteristic examples in a three-unit configuration of electric power converter units having the same electric power ratings according to Embodiment 1 of the present application and Embodiment 3 thereof.
Figure 7B:
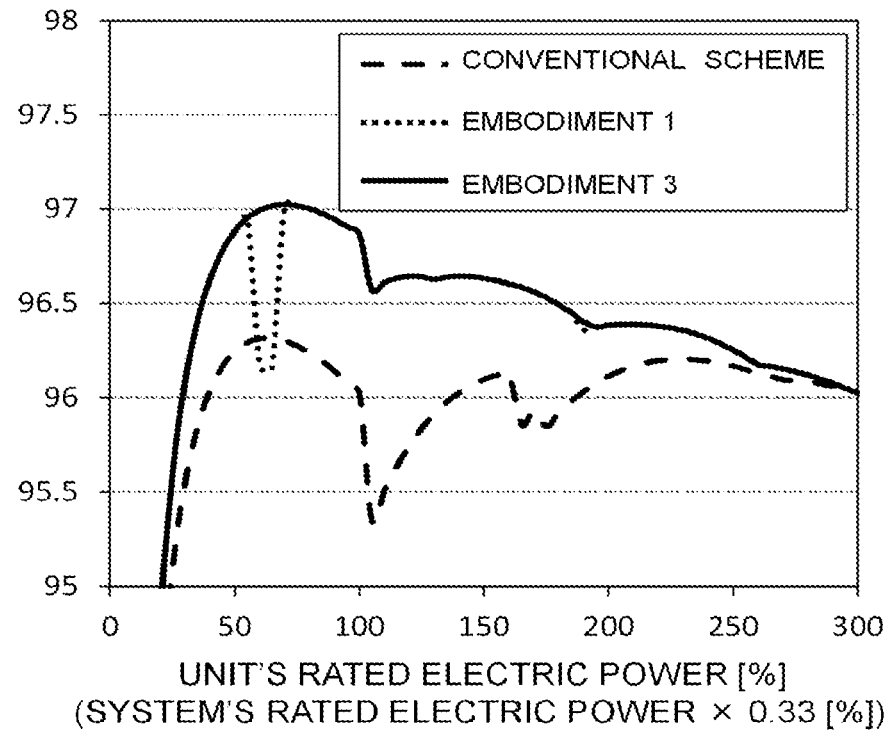

As a second example, the explanation will be made below for the procedures in which the electrical power conversion apparatus is constituted of the electric power converter units 2 each having the same electric-power capacity as three pieces of the converter A, the converter B and the converter C shown in FIGS. 7A and 7B, and the electric power sharing regulator 3 performs to implement electric power sharing responding to demanded electric power by using the electrical power conversion apparatus which shares the electric power in a priority order with respect to the converter A, the converter B and the converter C. Here, FIG. 7A is a diagram showing electric power conversion efficiencies with respect to input electric-power in every one of the individual converters A, B and C; and FIG. 7B is a diagram showing the relationship between unit's rated electric power and the electric power conversion efficiencies when electric power sharing schemes are modified using the converters shown in FIG. 7A, and is the diagram for explaining the difference of conversion efficiencies in cases in which the electric power sharing schemes are modified from a conventional scheme to the schemes carried out in the present application.

First, the explanation will be made for condition settings. A first electric-power threshold value of the converter A is set at 100% of normalized electric power; a second electric-power threshold value thereof, set at 70% of the normalized electric power; and a third electric-power threshold value thereof, set at 25% of the normalized electric power. A first electric-power threshold value of the converter B is set at 100% of the normalized electric power; a second electric-power threshold value thereof, set at 60% of the normalized electric power; and a third electric-power threshold value thereof, set at 35% of the normalized electric power. A first electric-power threshold value of the converter C is set at 100% of the normalized electric power; a second electric-power threshold value thereof, set at 60% of the normalized electric power; and a third electric-power threshold value thereof, set at 40% of the normalized electric power.

In the electrical power conversion apparatus constituted of the converter A through the converter C of the same electric-power capacity, the maximum charge-discharge electric-power of a parallel system is at 300% of the normalized electric power. Consequently, the electric power sharing regulator 3 regulates electric power sharing of the converter A through the converter C by responding to demanded electric power according to parallel system's charge-discharge in a manner as described below.

When the demanded electric power is from 300% of the normalized electric power or less to 260% thereof or more, the converter C is selected as an adjusting one, and the converter A and the converter B are selected at their first electric-power threshold values.

When the demanded electric power is from less than 260% of the normalized electric power to 220% thereof or more, the converter A is selected at its second electric-power threshold value; the converter B, selected as an adjusting one; and the converter C, selected at its first electric-power threshold value.

When the demanded electric power is from less than 220% of the normalized electric power to 190% thereof or more, the converter A is selected as an adjusting one, and the converter B and the converter C are selected at their second electric-power threshold values.

When the demanded electric power is from less than 190% of the normalized electric power to 160% thereof or more, the converter A is selected at its first electric-power threshold value; the converter B, selected as an adjusting one; and the converter C, selected at a zero output.

When the demanded electric power is from less than 160% of the normalized electric power to 130% thereof or more, the converter A is selected as an adjusting one; the converter B, selected at its second electric-power threshold value; and the converter C, selected at a zero output.

When the demanded electric power is from less than 130% of the normalized electric power to 100% thereof or more, the converter A is selected at its second electric-power threshold value; the converter B, selected as an adjusting one; and the converter C, selected at a zero output.

When the demanded electric power is from less than 100% of the normalized electric power to 70% thereof or more, the converter A is selected as an adjusting one, and the converter B and the converter C are selected at zero outputs.

When the demanded electric power is from less than 70% of the normalized electric power to 60% thereof or more, the converter B is selected as an adjusting one, and the converter A and the converter C are selected at zero outputs.

When the demanded electric power is less than 60% of the normalized electric power, the converter A is selected as an adjusting one, and the converter B and the converter C are selected at zero outputs.

In FIGS. 6B and 7B, a characteristic when an electric power sharing scheme stated in prior-art Patent Document 1 is applied (to be specific, an average or mean value of all of combinations when parallel operations are performed by sequentially modifying the combinations of the plurality of converters) is shown as a "conventional scheme" for the sake of comparison with the characteristic of Embodiment 1 where there exists no electric power limitation; thus, it can be understood that Embodiment 1 can achieve increased efficiency which is implemented over the wide ranges. Note that, in comparison with the characteristic when the electric power sharing scheme stated in prior-art Patent Document 1 is applied, Embodiment 1 has a condition where electric power conversion efficiency is low in parallel operations; however, it can be understood that not less than the electric power conversion efficiency of 95.5% can be secured which corresponds to the third electric-power threshold values of the converter A, the converter B and the converter C.

In the manner described above, in the electrical power conversion apparatus according to Embodiment 1, three items of rated efficiency (corresponding to a first electric-power threshold value), the highest efficiency (corresponding to a second electric-power threshold value) and allowable efficiency (corresponding to a third electric-power threshold value) receive attention from an efficiency characteristic of each of electric power converters; and the apparatus has a first operation mode in which a sharing ratio is regulated between electric power corresponding to the highest efficiency and that corresponding to the rated efficiency and an output from an unwanted electric power converter(s) is set at zero, a second operation mode in which a sharing ratio is regulated between electric power corresponding to the highest efficiency and that corresponding to the allowable efficiency and an output from an unwanted electric power converter(s) is set at zero, and a third operation mode in which a sharing ratio is regulated at electrical power corresponding to the allowable efficiency or less, and an output from an unwanted electric power converter(s) is set at zero. The explanation has been made for the apparatus that selects the first operation mode, the second operation mode and the third operation mode by responding to demanded electric power and to values of electric power corresponding to a first electric-power threshold value through a third electric-power threshold value of each of the electric power converters, and that implements increased efficiency as a group of the electric power converters.

Embodiment 2

Figure 8:
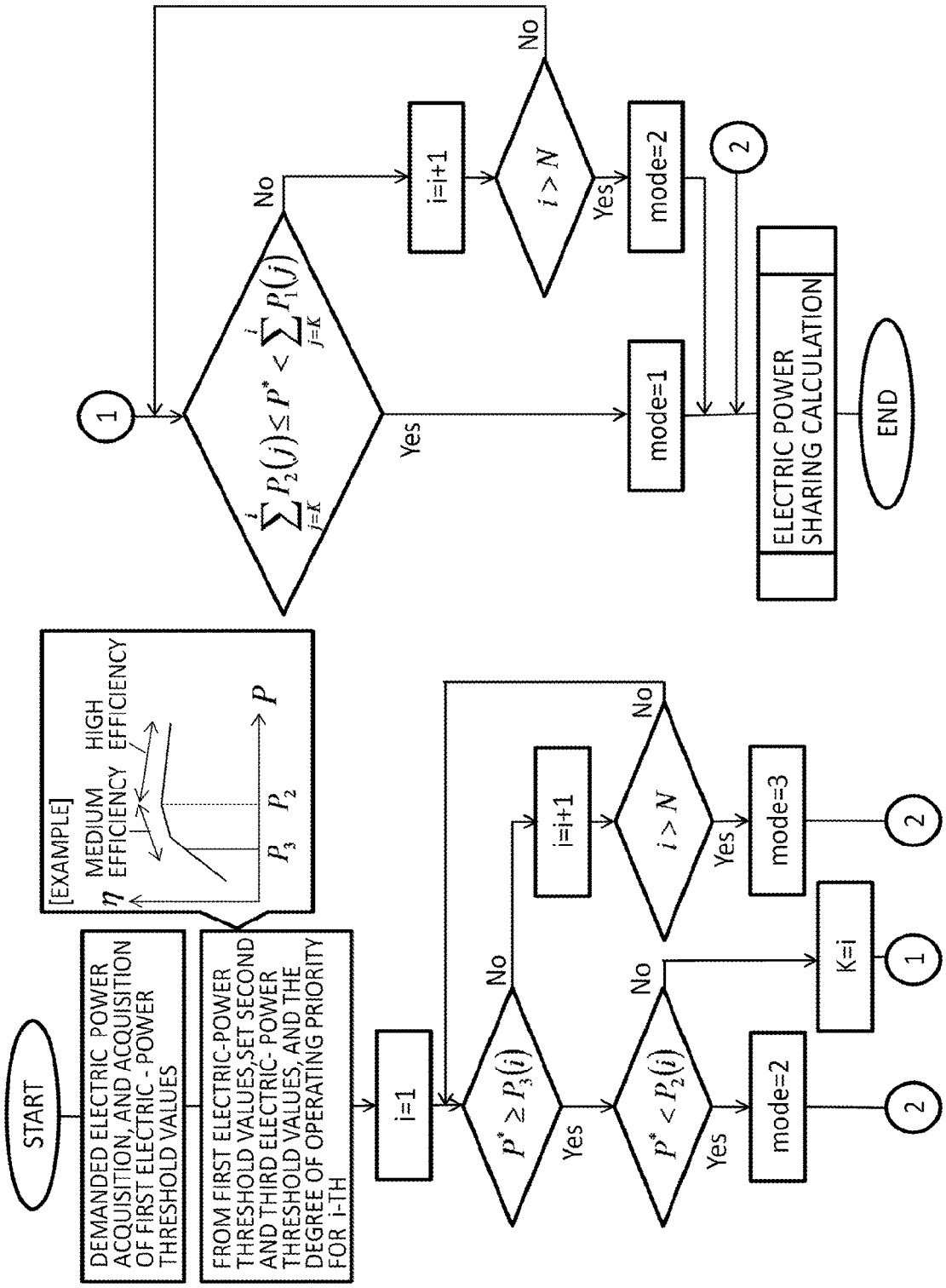
FIG. 8 is a diagram showing a configuration example of the selection flow of operation modes according to Embodiment 2 of the present application.

FIG. 8 is a diagram showing a configuration example of the selection flow of operation modes according to Embodiment 2 of the present application. In the electrical power conversion apparatus of Embodiment 2, a highly efficient charge-discharge function, in comparison with that of Embodiment 1, can be implemented in which a second electric-power threshold value and a third electric-power threshold value are made unnecessary. FIG. 8 shows a flowchart for implementing the aforementioned function. That is to say, a second electric-power threshold value and a third electric-power threshold value of the plurality of electric power converter units 2 each operated by the electric power sharing regulator 3 are determined by means of ratios defined in advance with respect to a first electric-power threshold value, whereby a highly efficient charge-discharge function can be implemented which is more simplified than that of Embodiment 1. For example, in FIG. 8, it is defined that $P_2=0.6P_1$, and that $P_3=0.4P_1$.

In Embodiment 2, similarly to Embodiment 1, one electric power converter unit 2 is determined, by responding to demanded electric power, for adjusting purposes among the plurality of electric power converter units 2, and the remaining electric power converter units 2 are operated at constant charge-discharge electric-power. Here, at the time of first operation mode, a value of the constant charge-discharge electric-power is that of electric power of a first electric-power threshold value, a second electric-power threshold value or zero; at the time of second operation mode, the value is electric power of a second electric-power threshold value, a third electric-power threshold value or zero; and at the time of third operation mode, the value means electric power of zero. In addition, the electric power sharing regulator 3 undertakes to preferentially share a second electric-power threshold value more than a first electric-power threshold value, whereby increased efficiency is implemented.

Embodiment 3

Figure 9:
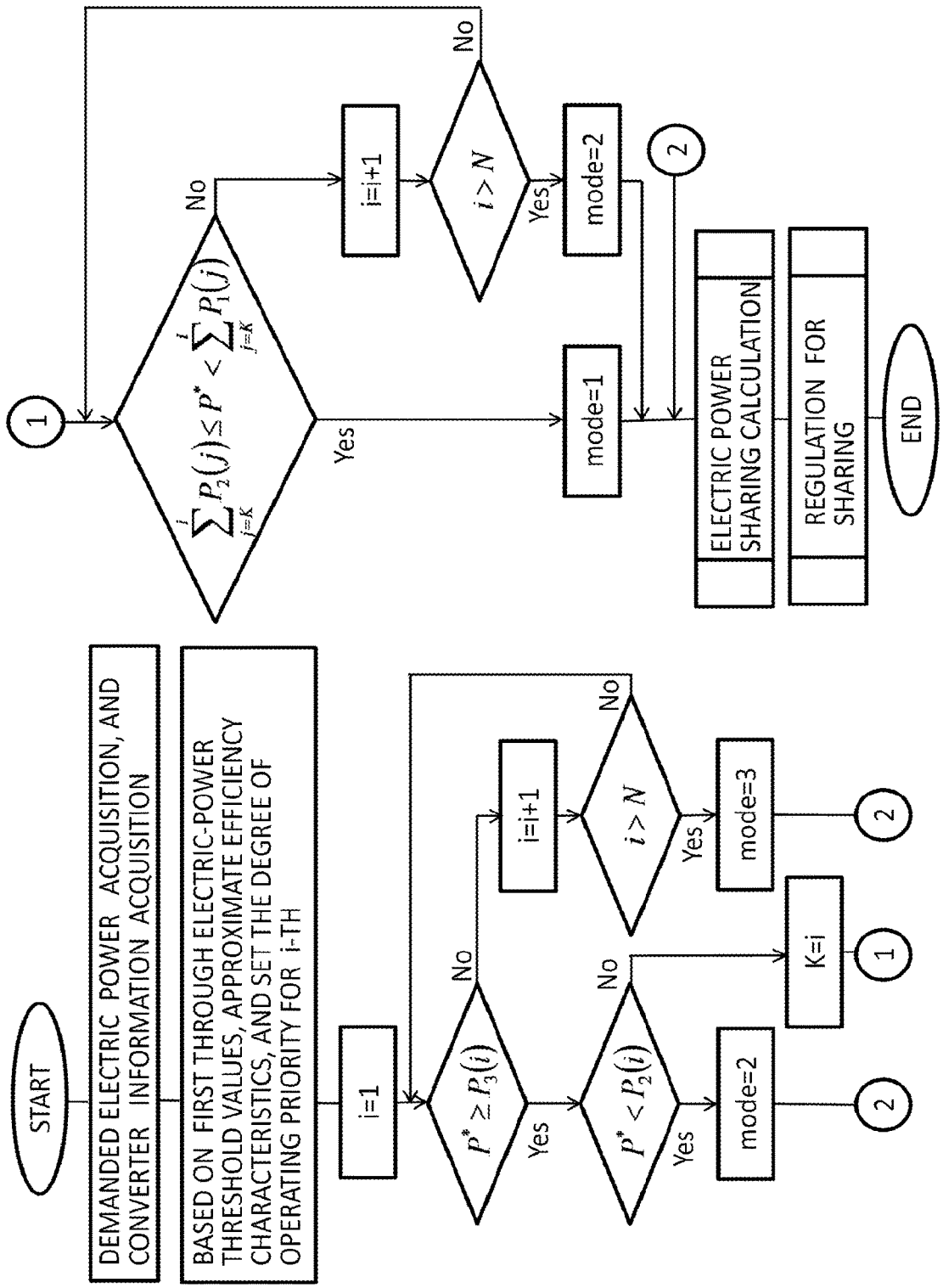
FIG. 9 is a diagram showing a configuration example of the selection flow of operation modes according to Embodiment 3 of the present application.

FIG. 9 is a diagram showing a configuration example of the selection flow of operation modes according to Embodiment 3 of the present application. In the electrical power conversion apparatus of Embodiment 3, in addition to the configuration of Embodiment 1, the configuration is taken in which a highly efficient charge-discharge function for enhancement is implemented by using electric power conversion efficiencies corresponding to a first electric-power threshold value through a third electric-power threshold value, an efficiency characteristic $\eta_1$ in which electric power conversion efficiency corresponding to the first electric-power threshold value and a second electric-power threshold value is linearly approximated, and an efficiency characteristic $\eta_2$ in which electric power conversion efficiency corresponding to the second electric-power threshold value and the third electric-power threshold value is linearly approximated. Note that, as for a linear approximation of an efficiency characteristic from the third electric-power threshold value to zero, the efficiency characteristic $\eta_1$ is utilized.

The efficiency characteristics of electrical power conversion being linearly approximated as described above are utilized in order to implement increased efficiency more than that of Embodiment 1. The larger a first electric-power threshold value is, the higher degrees of priority of starting up the electric power converter units 2 are set; and, when first electric-power threshold values are equivalent to one another, the higher an efficiency characteristic corresponding to a second electric-power threshold value is, the higher those degrees are set.

As for degrees of priority of the plurality of electric power converter units 2 operated by means of the electric power sharing regulator 3, when demanded electric power is not more than a third electric-power threshold value of each of the converter units, a converter unit having the smallest one of first electric-power threshold values is selected; and when the demanded electric power is not less than a third electric-power threshold value of each of the converter units, a converter unit having the largest one of first electric-power threshold values is selected so that large amount of electric power is preferentially outputted.

In Embodiment 3, increased efficiency is implemented more than that of Embodiment 1 by using electric power sharing results of the electric power converter units according to Embodiment 1, and using the aforementioned efficiency characteristics $\eta_1$ and $\eta_2$. When only one of the electric power converter units is not at zero in electric power sharing results according to Embodiment 1, an electric power converter unit is selected so that demanded electric power can be outputted from the one electric power converter unit by using the efficiency characteristics $\eta_1$ and $\eta_2$, and also that its electric power conversion efficiency is the highest at the demanded electric power.

When the electric power sharing results according to Embodiment 1 indicate that a plurality of electric power converter units is not at zero and also that electric power sharing by the aforementioned adjusting one of the electric power converter units is at its second electric-power threshold value or more, an operation condition under which an efficiency prediction value is higher is selected by comparing an efficiency prediction value using the results of Embodiment 1 with an efficiency prediction value when the electric power sharing by the adjusting one of the electric power converter units is modified to its second electric-power threshold value and when an electric power converter unit having the highest degree of priority is defined as the adjusting one among the units where the electric power sharing is at zero (the latter efficiency prediction value corresponds to an efficiency prediction value of Embodiment 3).

In addition, when the electric power sharing results according to Embodiment 1 indicate that a plurality of electric power converter units is not at zero and also that electric power sharing by the aforementioned adjusting one of the electric power converter units is at its second electric-power threshold value or less, an operation condition under which an efficiency prediction value is higher is selected by comparing an efficiency prediction value using the results of Embodiment 1 with an efficiency prediction value when the electric power sharing by the adjusting one of the electric power converter units is modified to zero and when an electric power converter unit having the lowest degree of priority is defined as the adjusting one among the units where the electric power sharing is at the second electric-power threshold value (the latter efficiency prediction value corresponds to an efficiency prediction value of Embodiment 3).

Note that, when electric power of an electric power converter unit in which the aforementioned electric power sharing has been modified to zero cannot be outputted by means of an electric power converter unit having the lowest degree of priority among the units where the electric power sharing is at the second electric-power threshold value, it may be adopted that electric power sharing of an electric power converter unit (s) where electric power sharing is at a second electric-power threshold value is set at a first electric-power threshold value in the order from lower degrees of priority.

As a first example, the explanation will be made for the procedures in which the electrical power conversion apparatus is constituted of electric power converter units 2 each having different electric-power capacity in three pieces of the converter A, the converter B and the converter C shown in FIGS. 6A and 6B, and the electric power sharing regulator 3 performs electric power sharing responding to demanded electric power by using the electrical power conversion apparatus which shares the electric power in a priority order with respect to the converter A, the converter B and the converter C.

First, the explanation will be made for condition settings. A first electric-power threshold value of the converter A is set at 200% of normalized electric power; a second electric-power threshold value thereof, set at 140% of the normalized electric power; and a third electric-power threshold value thereof, set at 40% of the normalized electric power. A first electric-power threshold value of the converter B is set at 130% of the normalized electric power; a second electric-power threshold value thereof, set at 100% of the normalized electric power; and a third electric-power threshold value thereof, set at 30% of the normalized electric power. A first electric-power threshold value of the converter C is set at 100% of the normalized electric power; a second electric-power threshold value thereof, set at 60% of the normalized electric power; and a third electric-power threshold value thereof, set at 40% of the normalized electric power.

In the electrical power conversion apparatus constituted of the converter A through the converter C each having the same electric-power capacity, the maximum charge-discharge electric-power of a parallel system is given by combining values of first electric-power threshold values of the converters A, B and C described above as a total (=200+130+100), which is 430% of the normalized electric power. Consequently, the electric power sharing regulator 3 regulates electric power sharing of the converter A through the converter C by responding to demanded electric power due to parallel system's charge-discharge in a manner as described below.

When the demanded electric power is from 430% of the normalized electric power or less to 390% thereof or more, the converter C is selected as an adjusting one, and the converter A and the converter B are selected at their first electric-power threshold values.

When the demanded electric power is from less than 390% of the normalized electric power to 360% thereof or more, the converter C is selected at its second electric-power threshold value; the converter B, selected as an adjusting one; and the converter A, selected at its first electric-power threshold value.

When the demanded electric power is from less than 360% of the normalized electric power to 300% thereof or more, the converter A is selected as an adjusting one, and the converter B and the converter C are selected at their second electric-power threshold values.

When the demanded electric power is from less than 300% of the normalized electric power to 240% thereof or more, the converter A is selected as an adjusting one; the converter B, selected at its second electric-power threshold value; and the converter C, selected at a zero output.

When the demanded electric power is from less than 240% of the normalized electric power to 200% thereof or more, the converter A is selected as an adjusting one; the converter B, selected at a zero output; and the converter C is selected at its second electric-power threshold value.

When the demanded electric power is from less than 200% of the normalized electric power to 130% thereof or more, the converter A is selected as an adjusting one, and the converter B and the converter C are selected at zero outputs.

When the demanded electric power is from less than 130% of the normalized electric power to 100% thereof or more, the converter B is selected as an adjusting one, and the converter A and the converter C are selected at zero outputs.

When the demanded electric power is from less than 100% of the normalized electric power to 60% thereof or more, the converter C is selected as an adjusting one, and the converter A and the converter B are selected at zero outputs.

When the demanded electric power is from less than 60% of the normalized electric power to 40% thereof or more, the converter A is selected as an adjusting one, and the converter B and the converter C are selected at zero outputs.

When the demanded electric power is from less than 40% of the normalized electric power to 30% thereof or more, the converter B is selected as an adjusting one, and the converter A and the converter C are selected at zero outputs.

When the demanded electric power is less than 30% of the normalized electric power, the converter C is selected as an adjusting one, and the converter A and the converter B are selected at zero outputs.

As a second example, the explanation will be made for the procedures in which the electrical power conversion apparatus is constituted of electric power converter units 2 each having the same electric-power capacity in three pieces of the converter A, the converter B and the converter C shown in FIGS. 7A and 7B, and the electric power sharing regulator 3 performs electric power sharing responding to demanded electric power by using the electrical power conversion apparatus which shares the electric power in a priority order with respect to the converter A, the converter B and the converter C.

First, the explanation will be made for condition settings. A first electric-power threshold value of the converter A is set at 100% of normalized electric power; a second electric-power threshold value thereof, set at 70% of the normalized electric power; and a third electric-power threshold value thereof, set at 25% of the normalized electric power. A first electric-power threshold value of the converter B is set at 100% of the normalized electric power; a second electric-power threshold value thereof, set at 60% of the normalized electric power; and a third electric-power threshold value thereof, set at 35% of the normalized electric power. A first electric-power threshold value of the converter C is set at 100% of the normalized electric power; a second electric-power threshold value thereof, set at 60% of the normalized electric power; and a third electric-power threshold value thereof, set at 40% of the normalized electric power.

In the electrical power conversion apparatus constituted of the converter A through the converter C each having the same electric-power capacity, the maximum charge-discharge electric-power of a parallel system is given by combining values of first electric-power threshold values of the converters A, B and C described above as a total (=100+100+100), which is 300% of the normalized electric power. Consequently, the electric power sharing regulator 3 regulates electric power sharing of the converter A through the converter C by responding to demanded electric power due to parallel system's charge-discharge in a manner as described below.

When the demanded electric power is from 300% of the normalized electric power or less to 260% thereof or more, the converter C is selected as an adjusting one, and the converter A and the converter B are selected at their first electric-power threshold values.

When the demanded electric power is from less than 260% of the normalized electric power to 220% thereof or more, the converter A is selected at its second electric-power threshold value; the converter B, selected as an adjusting one; and the converter C, selected at its first electric-power threshold value.

When the demanded electric power is from less than 220% of the normalized electric power to 190% thereof or more, the converter A is selected as an adjusting one, and the converter B and the converter C are selected at their second electric-power threshold values.

When the demanded electric power is from less than 190% of the normalized electric power to 160% thereof or more, the converter A is selected at its first electric-power threshold value; the converter B, selected as an adjusting one; and the converter C, selected at a zero output.

When the demanded electric power is from less than 160% of the normalized electric power to 130% thereof or more, the converter A is selected as an adjusting one; the converter B, selected at its second electric-power threshold value; and the converter C, selected at a zero output.

When the demanded electric power is from less than 130% of the normalized electric power to 100% thereof or more, the converter A is selected at its second electric-power threshold value; the converter B, selected as an adjusting one; and the converter C, selected at a zero output.

When the demanded electric power is from less than 100% of the normalized electric power to 70% thereof or more, the converter A is selected as an adjusting one, and the converter B and the converter C are selected at zero outputs.

When the demanded electric power is from less than 70% of the normalized electric power to 60% thereof or more, the converter B is selected as an adjusting one, and the converter A and the converter C are selected at zero outputs.

When the demanded electric power is less than 60% of the normalized electric power, the converter A is selected as an adjusting one, and the converter B and the converter C are selected at zero outputs.

When there is no converter which performs a zero output according to the electric power sharing results described above, it may be adopted that, among three of the converter A through the converter C, one converter is set at a zero output, and another converter, set at any one of its first electric-power threshold value through its third electric-power threshold value, whilst the remaining one converter, set as an adjusting one, and that an efficiency trial calculation is performed by using the efficiency characteristics $\eta_1$ and $\eta_2$, and a sharing result(s) superior in a value of the efficiency trial-calculation is selected by comparing the aforementioned sharing results with one another.

When there is only one converter which performs a zero output according to the sharing results, it may be adopted that one converter is set at a zero output between the remaining two converters, and the remaining one converter, set as an adjusting one, and that an efficiency trial calculation is performed by using the efficiency characteristics $\eta_1$ and $\eta_2$, and a sharing result (s) superior in a value of the efficiency trial-calculation is selected by comparing the aforementioned sharing results with one another.

When there are two converters which perform zero outputs according to the sharing results, it may be adopted that the remaining one converter is set at a zero output, and one converter is set as an adjusting one between the remaining two converters having been set at the zero outputs, and that an efficiency trial calculation is performed by using the efficiency characteristics $\eta_1$ and $\eta_2$, and a sharing result (s) superior in a value of the efficiency trial-calculation is selected by comparing the aforementioned sharing results with one another.

In FIGS. 6B and 7B, a characteristic when an electric power sharing scheme stated in prior-art Patent Document 1 is applied is shown as a "conventional scheme" together with the characteristic of Embodiment 1 for the sake of comparison with that of Embodiment 3 where there exists no electric power limitation; thus, it can be understood that, also in any pair of FIGS. 6A and 6B, and FIGS. 7A and 7B, increased efficiency can be implemented over all ranges (all the ranges of parallel system's input electric-power) in the electrical power conversion apparatus of Embodiment 3.

Figure 10:
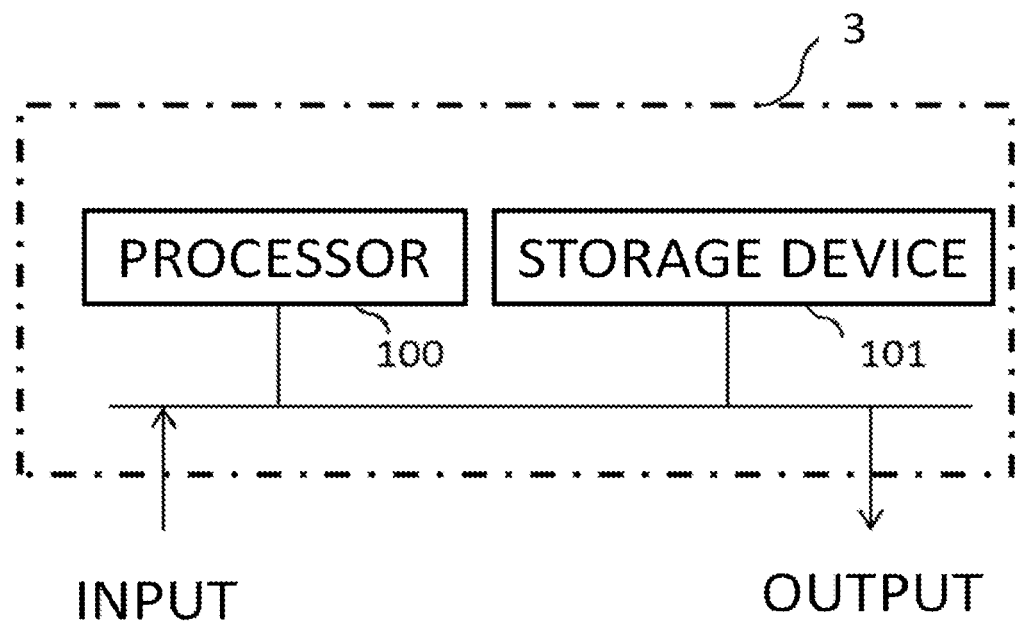
FIG. 10 is a diagram showing an example of hardware for an electric power sharing regulator according to Embodiments 1 through 3 of the present application.

It should be noted that, as an example of hardware is illustrated in FIG. 10, the electric power sharing regulator 3 is constituted of a processor 100 and a storage device 101. The storage device 101 is provided with a volatile storage device of a random access memory (RAM) or the like, and with a nonvolatile auxiliary storage device of a flash memory or the like, which are not shown in the figure. In addition, in place of the flash memory, an auxiliary storage device of a hard disk may be provided with. The processor 100 executes a program (s) inputted from the storage device 101. In this case, the program (s) is inputted into the processor 100 from the auxiliary storage device by way of the volatile storage device. Moreover, the processor 100 may output its data of a calculated result (s) or the like into the volatile storage device of the storage device 101, or may store the data into the auxiliary storage device by way of the volatile storage device.

In a similar manner, also, the electric power converter unit 2 includes in its interior the processor 100 and the storage device 101 described above, which perform similar operations described above. It is further needless to say that, similarly to the electric power sharing regulator 3, the electric power converter unit 2 includes input-output devices for exchanging information with other devices.

Furthermore, in the present application, each of the embodiments can be freely combined, and/or each of the embodiments can be appropriately modified or eliminated without departing from the scope of the application.

EXPLANATION OF NUMERALS

Symbols "1," "1a," "1b," "1c," each designate a DC power source; "2," "2a," "2b," electric power converter unit; "3," electric power sharing regulator; "100," processor; and "101," storage device.

What is claimed is:
1. An electrical power conversion apparatus, comprising:
a plurality of electric power converter units being connected in parallel with one another, and each possessing electric power information indicating a relationship between a value of electric power and efficiency, and attribute information including information of a degree of operating priority being an operating order; and an electric power sharing regulator for regulating, by responding to demanded electric power, electric power shared by each of the electric power converter units, wherein the electric power sharing regulator supervises go/no-go determination of electrical power conversion operations of the electric power converter units with reference to the attribute information taken in possession from each of the electric power converter units, and regulates electric power in which each of the electric power converter units shares by utilizing a first electric-power threshold value corresponding to rated efficiency of each of the plurality of electric power converter units, a second electric-power threshold value corresponding to a highest efficiency of each of the plurality of electric power converter units, and a third electric-power threshold value corresponding to allowable efficiency being efficiency to become a reference of each of the plurality of electric power converter units, where the electric-power threshold values are pieces of information related to electric power information in the attribute information.

2. The electrical power conversion apparatus as set forth in claim 1, wherein the attribute information includes information on parallel connection configurations at input ends of the plurality of electric power converter units and at output ends thereof; and the electric power sharing regulator sets a degree of operating priority of each of the electric power converter units by using the attribute information.

3. The electrical power conversion apparatus as set forth in claim 2, wherein the electric power sharing regulator selects, by responding to the demanded electric power, one operation mode from three types of operation modes of a first operation mode in which electric power adjustment of the electric power converter units is performed in a range from the first electric-power threshold value to the second electric-power threshold value and an output from an unwanted electric power converter unit is set at zero, a second operation mode in which electric power adjustment of the electric power converter units is performed in a range between the second electric-power threshold value and the third electric-power threshold value and an output from an unwanted electric power converter unit is set at zero, and a third operation mode in which electric power adjustment of the electric power converter units is performed in a range of the third electric-power threshold value or less and an output from an unwanted electric power converter unit is set at zero, whereby electric power in which each of the electric power converter units shares with one another is regulated by means of the electric power sharing regulator.

4. The electrical power conversion apparatus as set forth in claim 3, wherein the first operation mode undertakes that charge-discharge electric-power of the electric power converter units other than an adjusting one of the electric power converter units is set at the first electric-power threshold value, the second electric-power threshold value or zero, when the demanded electric power is not less than a sum of the second electric-power threshold values of two or more of the electric power converter units, and that charge-discharge electric-power of the electric power converter units other than an adjusting one of the electric power converter units is set at zero, when the demanded electric power is not less than the second electric-power threshold value of one of the electric power converter units;

the second operation mode undertakes that charge-discharge electric-power of the electric power converter units other than an adjusting one of the electric power converter units is set at the second electric-power threshold value, the third electric-power threshold value or zero, when there does not exist a case of electric power sharing which satisfies the first operation mode and when the demanded electric power is not less than a sum of the third electric-power threshold values of two or more of the electric power converter units, and that charge-discharge electric-power of the electric power converter units other than an adjusting one of the electric power converter units is set at zero, when the demanded electric power is not less than the third electric-power threshold value of one of the electric power converter units; and the third operation mode undertakes that charge-discharge electric-power of the electric power converter units other than an adjusting one of the electric power converter units is set at zero, when there does not exist a case of electric power sharing which satisfies the first operation mode or the second operation mode.

5. The electrical power conversion apparatus as set forth in claim 3, wherein the first operation mode undertakes that charge-discharge electric-power of each of the electric power converter units is set so that efficiency thereof becomes highest by using said first efficiency characteristic in which efficiency of an electric power section between the approximated by using the rated efficiency and the highest efficiency, when the demanded electric power is not less than a sum of the second electric-power threshold values of at least one or more of the electric power converter units;

the second operation mode undertakes that charge-discharge electric-power of each of the electric power converter units is set so that efficiency thereof becomes highest by using a second efficiency characteristic in which efficiency of an electric power section between the second electric-power threshold value and the third electric-power threshold value is linearly approximated by using the highest efficiency and the allowable efficiency, when there does not exist a case of electric power sharing which satisfies the first operation mode and when the demanded electric power is not less than a sum of the third electric-power threshold values of at least one or more of the electric power converter units; and the third operation mode undertakes that charge-discharge electric-power of the electric power converter units other than an adjusting one of the electric power converter units is set at zero, when there does not exist a case of electric power sharing which satisfies the first operation mode or the second operation mode.

6. The electrical power conversion apparatus as set forth in claim 3, wherein, in a configuration in which a DC power source connected to an electric power converter unit has a device for supervising or monitoring the DC power source which can acquire any piece of information of go/no-go determination of electric charging, go/no-go determination of electric discharging, an upper limit of electric charging power and an upper limit of electric discharging power by means of the device for supervising or monitoring the DC power source, the electric power converter unit performs limitation on a charging operation or discharging operation by responding to information of the device for supervising or monitoring the DC power source; and the electric power sharing regulator detects limitation on the charging operation or discharging operation, and limits electric power in which the electric power converter unit share with one another.

7. The electrical power conversion apparatus as set forth in claim 3, wherein, in a configuration in which a DC power source connected to an electric power converter unit is a power source of a mobile body, the electric power sharing regulator removes the electric power converter unit to which the mobile body is connected from an object of the first operation mode through the third operation mode, and preferentially charges with electricity into the DC power source.

8. The electrical power conversion apparatus as set forth in claim 2, wherein the electric power sharing regulator can input thereinto the first electric-power threshold value, and acquires, by using two pieces of information defined in advance which are a first ratio expressed from zero to one corresponding to the second electric-power threshold value and a second ratio expressed from zero to one corresponding to the third electric-power threshold value, the second electric-power threshold value with reference to a product of the first electric-power threshold value and the first ratio, and the third electric-power threshold value with reference to a product of the first electric-power threshold value and the second ratio.

9. The electrical power conversion apparatus as set forth in claim 2, wherein the electric power sharing regulator acquires the first electric-power threshold value through the third electric-power threshold value, when the first electric-power threshold value through the third electric-power threshold value are set in advance in the electric power converter units each.

10. The electrical power conversion apparatus as set forth in claim 2, wherein the electric power sharing regulator acquires the attribute information, when the first electric-power threshold value of the plurality of electric power converter units through the third electric-power threshold value thereof are set in advance in the electric power sharing regulator.

11. The electrical power conversion apparatus as set forth in claim 2, wherein the electric power sharing regulator acquires electric power information corresponding to the first electric-power threshold value through the third electric-power threshold value, and determines a degree of operating priority of each of the electric power converter units based on the electric power information.

12. The electrical power conversion apparatus as set forth in claim 2, wherein the electric power sharing regulator acquires attribute information of an electric power converter unit, and determines a degree of operating priority of the electric power converter unit based on the attribute information.

13. The electrical power conversion apparatus as set forth in claim 2, wherein the degree of operating priority is set in decreasing order of the first electric-power threshold value other than a case in which the degree of operating priority is modified through information related to a degree of operating priority given in advance.

14. The electrical power conversion apparatus as set forth in claim 2, wherein the electric power sharing regulator generates, by using information of the rated efficiency, that of the highest efficiency and that of allowable efficiency, a first efficiency characteristic in which efficiency of an electric power section between the first electric-power threshold value and the second electric-power threshold value is linearly approximated by using the rated efficiency and the highest efficiency, and generates thereby a second efficiency characteristic in which efficiency of an electric power section between the second electric-power threshold value and the third electric-power threshold value is linearly approximated by using the highest efficiency and the allowable efficiency.

15. The electrical power conversion apparatus as set forth in claim 2, wherein values of the first electric-power threshold value through the third electric-power threshold value are modified, with respect to an input voltage and an output voltage of an electric power converter unit, by responding to either one or both of their voltage's magnitudes.

* * * * *